United States Patent
West et al.

(10) Patent No.: US 9,734,509 B2
(45) Date of Patent: Aug. 15, 2017

(54) SYSTEM AND METHOD FOR PROVIDING A CASHLESS VENDING DONATION TRANSACTION

(75) Inventors: Ryan Lee West, Newnan, GA (US); Rick Kanemasu, Alpharetta, GA (US)

(73) Assignee: THE COCA-COLA COMPANY, Atlanta, GA (US)

( * ) Notice: Subject to any disclaimer, the term of this patent is extended or adjusted under 35 U.S.C. 154(b) by 883 days.

(21) Appl. No.: 13/456,055

(22) Filed: Apr. 25, 2012

(65) Prior Publication Data

US 2013/0290146 A1    Oct. 31, 2013

(51) Int. Cl.
*G06Q 20/22* (2012.01)
*G06Q 30/00* (2012.01)
*G06Q 30/02* (2012.01)
*G06Q 20/18* (2012.01)
*G07F 9/00* (2006.01)

(52) U.S. Cl.
CPC ............ *G06Q 30/02* (2013.01); *G06Q 20/18* (2013.01); *G07F 9/00* (2013.01)

(58) Field of Classification Search
CPC .................................. G06Q 20/18; G07F 9/00
USPC ................................................. 700/232, 237
See application file for complete search history.

(56) References Cited

U.S. PATENT DOCUMENTS

| | | | | |
|---|---|---|---|---|
| 5,466,919 A * | 11/1995 | Hovakimian | .......... | G06Q 20/10 235/380 |
| 5,546,303 A | 8/1996 | Helbling | | |
| 5,724,518 A * | 3/1998 | Helbling | .......... | 705/1.1 |
| 6,253,998 B1 * | 7/2001 | Ziarno | .......... | A47G 33/00 235/380 |
| 7,058,581 B1 * | 6/2006 | Young | .......... | G06Q 10/08 221/7 |
| 8,755,934 B1 * | 6/2014 | Dershem | .......... | G07F 9/023 700/232 |
| 8,840,015 B2 * | 9/2014 | Baker | .......... | G06Q 30/02 235/379 |
| 2002/0052756 A1 * | 5/2002 | Lomangino | .......... | G06Q 30/02 705/329 |
| 2002/0062173 A1 * | 5/2002 | Gzybowski | .......... | 700/232 |
| 2002/0077889 A1 * | 6/2002 | Kolls | .......... | 705/14 |
| 2006/0293956 A1 | 12/2006 | Walker et al. | | |
| 2007/0034681 A1 * | 2/2007 | Kamiya | .......... | G07F 9/04 235/379 |
| 2008/0006649 A1 * | 1/2008 | Masters | .......... | G06Q 30/00 221/154 |
| 2008/0033855 A1 * | 2/2008 | Baker | .......... | G06Q 30/02 705/35 |

(Continued)

FOREIGN PATENT DOCUMENTS

WO    2012037934    3/2012

OTHER PUBLICATIONS

International Search Report and Written Opinion for International Application No. PCT/US2013/037905 mailed Aug. 2, 2013.

*Primary Examiner* — Michael K Collins
(74) *Attorney, Agent, or Firm* — Eversheds Sutherland (US) LLP

(57) ABSTRACT

The present invention relates to a system and method of utilizing a vending machine to make a charitable donation. A vending machine offering product/service for sale and a donation transaction for selection by the user. Payment of the donation amount is received at the vending machine and transmitted to the charitable organization.

19 Claims, 2 Drawing Sheets

(56) References Cited

U.S. PATENT DOCUMENTS

| | | | |
|---|---|---|---|
| 2008/0072406 A1* | 3/2008 | Sinclair | 27/1 |
| 2009/0281892 A1* | 11/2009 | Deakin et al. | 705/14.38 |
| 2010/0088192 A1 | 4/2010 | Bowles | |
| 2012/0066065 A1 | 3/2012 | Switzer | |
| 2012/0276868 A1* | 11/2012 | Martell | H04L 12/1453 455/406 |
| 2014/0316563 A1* | 10/2014 | Dershem | 700/238 |

\* cited by examiner

SYSTEM AND METHOD FOR PROVIDING A CASHLESS VENDING DONATION TRANSACTION

TRADEMARKS

COCA-COLA® is a registered trademark of The Coca-Cola Company, Atlanta, Ga., U.S.A. Other names used herein may be registered trademarks, trademarks or product names of The Coca-Cola Company or other companies.

TECHNICAL FIELD OF THE INVENTION

The present disclosure relates generally to the use of a vending machine to complete a transaction, and more particularly to systems and methods for utilizing a vending machine to make a charitable donation.

BACKGROUND OF THE INVENTION

Traditional models of charitable donation are cumbersome and receive a positive response from a very limited donor pool. For example, general models of donation require the donor initiate the donation transaction or at the very least respond in equal measure as the recipient of a donation request. In some cases the donor can respond to a donation request by mailing a check or submitting credit card information online. These are both actions that rely on the donor initiative. As a result, the success rate with mail-in or internet submitted donations is limited.

One conventional approach to making donation transactions more convenient is to provide the donor the opportunity to donate over the phone. Typically, organizations will call potential donors (e.g., a pledge drive) or the donor may call in to the organization unprompted to submit a donation. The donor then provides either credit card or bank account information that is used by the organization to process the donation transaction. While these methods provide the donor with some convenience in when and where they can make their donation, some donors are hesitant to provide confidential banking/credit card information over the phone and are deterred from donating using this model.

In an effort to make donation transactions easier and more appealing to a broader pool of donors, several organizations utilize a mobile device text model for receiving donations. In these systems the donor texts a word or phrase to a designated number and their donation is charged to their telephone bill. This model, while slightly more convenient for the donor, requires donors pay the donation amount on their phone bill, making it harder to track their charitable contributions, which may not appeal to some donors. Additionally, some donors will be charged text messaging rates by their mobile service provider in addition to their donation amount. While text messaging charges are generally small, the implication of having an additional charge, unrelated to the donation, on their phone bill may detract some donors. Therefore, a need in the art exists for systems and methods that overcome one or more of the above-described limitations of conventional donation models.

SUMMARY OF THE INVENTION

Some or all of the above needs can be addressed by the various embodiments of the invention. Embodiments of the invention can provide systems and methods for providing donations using a vending machine.

The present disclosure provides novel devices, systems, and methods for providing a vending machine that process donation transactions. For one aspect of the present invention, the vending machine includes a product housing storing a product offered for sale by the vending machine and a dispenser for dispensing the product. The vending machine can further include a transaction device operable to facilitate a payment transaction associated with a purchase by a user of at least one of the product and a service offered for sale by the vending machine and a donation transaction. The vending machine can also include a controller for controlling operation of the vending machine and operable to communicate with the transaction device. The controller can be further operable to provide instructions to the dispenser for dispensing a product in response to the payment transaction facilitated at the transaction device.

Another aspect of the present invention provides a method of operating a vending machine. The method can include providing at a vending machine at least one of a product and a service offered for sale by the vending machine, and a donation transaction. The method can further include providing a controller for controlling operation of the vending machine and receiving, at the controller, a user selection of at least one of the product, the service, and the donation transaction. The method can further include receiving a payment associated with the user selection at a transaction device, the transaction device operably coupled to the controller and operable to facilitate a payment transaction associated with user selection and processing the payment transaction.

Another aspect of the present invention provides a computer-readable storage medium storing instructions that when executed by a processor cause a computer to perform a method for providing a donation transaction at a vending machine. The method can include providing an indication of at least one of a product and a service offered for sale by the vending machine, and a donation transaction. The method can further include receiving a user selection for the donation transaction. The method can further include receiving a payment corresponding to the user selection at a transaction device coupled to the vending machine and processing the payment.

These and other aspects, features, and embodiments of the invention will become apparent to a person of ordinary skill in the art upon consideration of the following detailed description of illustrated embodiments exemplifying the best mode for carrying out the invention as presently perceived.

DETAILED DESCRIPTION OF THE INVENTION

In an effort to make donating to a charitable cause convenient and accessible to a broad range of donors, the present invention incorporates the ease and availability of vending machines to overcome the above-described limitations of conventional donation solicitation. In the vending industry a wide range of consumer goods have been made available in vending machines. Vending machines sell everything from candy to toilet paper and have virtually limitless operating hours with 24 hours a day, 7 days a week functionality. In recent years, cashless payments (e.g., credit cards, RFID digital wallets incorporated into mobile devices) have become an option for payments at vending machines. As a result a user of vending equipment may now be able to use cashless payments, in addition to coin and bill payments, for vended goods and services. The convenience and ease of vending machines, particularly cashless vending machines, makes them very appealing to modern consumers. The present invention incorporates a donation transaction into a standard vend transaction, thereby allowing the consumer-donor to purchase goods from the vending machine and make a donation all in the same transaction.

As used herein, the term "transaction" can refer to a cash or cashless payment associated with a purchase of a good and/or service. Embodiments of the invention are intended to cover any combination of cash and/or cashless payments or transactions as well as payments or transactions relating to any combination of goods and/or services.

As used herein, the terms "server switch" and "server" can be used interchangeably. Embodiments of the invention are intended to cover any combination of servers, server switches, or other processing devices with similar functionality to a server or server switch.

Figure 1:
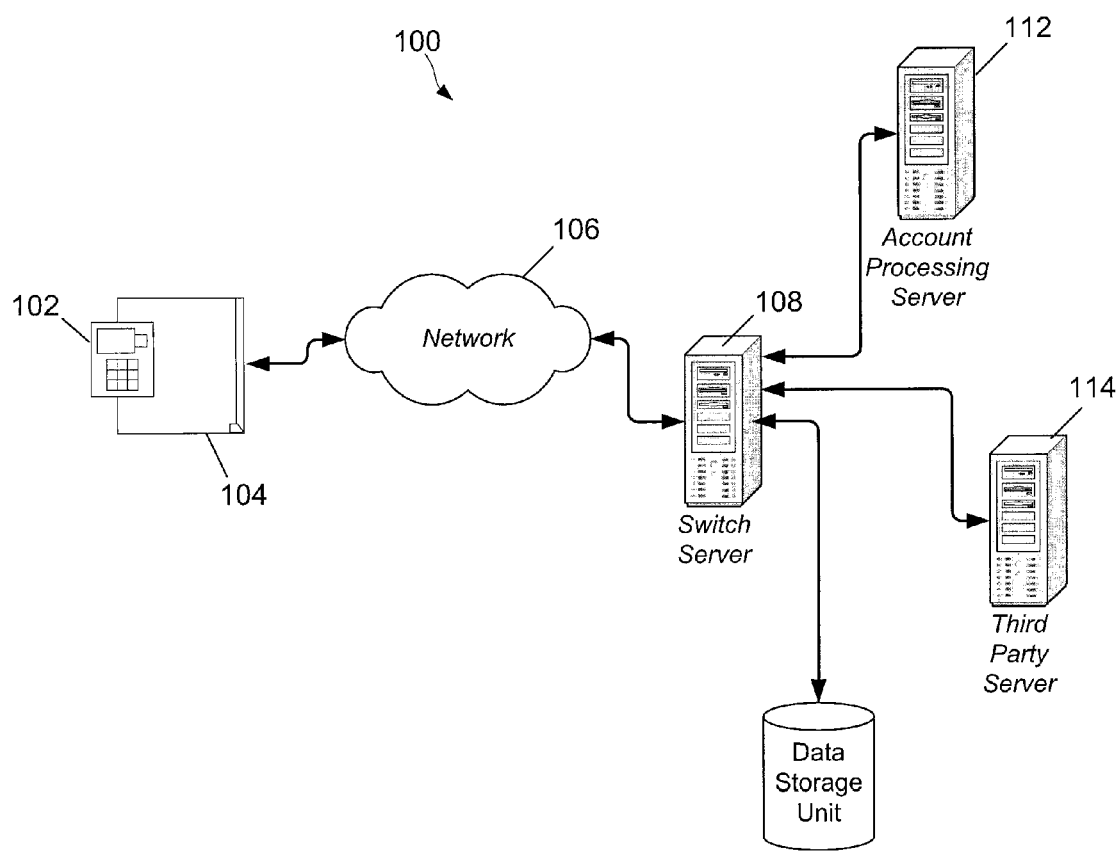
FIG. 1 is a block diagram depicting an operating environment implementing a loyalty award program in accordance with certain exemplary embodiments.

The exemplary embodiment described herein are directed to systems and methods for providing donations using a vending machine. FIG. 1 illustrates the main components of an exemplary vending environment 100. The vending environment 100 can include transaction devices 102A-N, vending equipment 104A-N, switch server 108, data storage unit 110, account processing server 112, and third party server 114, each communicating across a network 106. While certain embodiments are described in which parts of the vending machine donation transaction are implemented in software, it will be appreciated that one or more acts or functions of the vending system may be performed by hardware, software, or a combination thereof, as may be embodied in one or more computing systems. For example, the transaction device 102, switch server 108, account processing server 112, and third party server 114 can be embodied as stand alone application programs or as a companion program to a web browser having messaging and storage capabilities.

In an exemplary embodiment, the transaction device 102, vending equipment 104, switch server 108, account processing server 112, and third party server 114, and/or other data processing resources as may be required, can communicate over the network 106. The network 106 includes a wired or wireless communication system or device by which network devices (including transaction device 102, vending equipment 104, switch server 108, account processing server 112, and third party server 114) can exchange data. For example, the network 106 can include a telecommunications network, a local area network (LAN), a wide area network (WAN), an intranet, an Internet, or any combination thereof. In an exemplary embodiment, the communication between the transaction device 102, switch server 108, account processing server 112, and third party server 114 can be encrypted to protect and secure the data communication between the systems. It will be appreciated that the network connections disclosed are exemplary and other means of establishing a communications link between the transaction device 102, vending equipment 104, switch server 108, account processing server 112, and third party server 114, can be used.

The exemplary vending environment 100 includes one or more transaction devices 102A-N associated with respective vending equipment 104A-N, wherein 'N' refers to some unknown number of a plurality of transaction devices and vending equipment. In an exemplary embodiment, the transaction devices 102A-N can communicate using the network 106 with one or more servers. It is also contemplated that the transaction devices 102A-N can also be in communication with each other and the respective vending machines using the network 106.

Transaction devices 102A-N can be any processor-type device, and may be referred to individually as a data processing device. Some or all transaction devices 102 can be operable to receive and transmit data associated with at least one cash and/or cashless transaction, a consumer, and/or a donation transaction. Such data may be referred to as transaction data. In an exemplary embodiment, the transaction device 102 can transmit the transaction data, using the network 106, to the server switch 108, and then on to the account processing server and third-party server 114. Transaction data initially received or otherwise collected by the transaction device 102 can be transmitted to the server switch 108 in a format such as a data packet 124.

In one embodiment, a transaction device 102 can be a payment device operable to accept a cash and/or cashless payment from a consumer, and further operable to facilitate the dispensing of goods and/or services from associated vending equipment 104. In an exemplary embodiment, a transaction device 102 can be placed at a vending machine, such as a COCA-COLA vending machine. In another embodiment, the transaction device 102 can be a vending equipment controller operable to facilitate the operation of associated vending equipment 104. For example, the transaction devices 102 can be embodied as a credit card terminal, RFID payment terminal, a cash payment terminal, a biometric reader, an energy management system (EMS)-type device, a vending machine controller (VMC), and any other type of payment transaction devices. Such terminal-type embodiments can alternatively be based in software or firmware and integrated into existing vending equipment.

In an exemplary embodiment, the vending equipment 104 can include, but is not limited to, a device for facilitating a donation transaction, a product or beverage dispenser, a vending machine, a snack dispenser, a device capable of dispensing or providing a consumable food or drink item, a device capable of dispensing or providing a non-consumable item, or a device capable of facilitating purchase of a good and/or service. Vending equipment 104 can also be referred to individually as a vending machine. In an exemplary embodiment, a donation transaction includes a monetized donation amount and/or any other form of cash equivalent donation. When the user selects the donation transaction, the cash value of the donation amount is added to the user's transaction total and charged to the user when the transaction is processed. In an exemplary embodiment, the vending equipment 104 provides a plurality of donation transactions for the user to choose from. In an alternate embodiment, the vending equipment provides a single donation for the user's selection.

For example, a user may select a $2.00 donation to the American Red Cross. In an exemplary embodiment, the user has not selected any other items for purchase at the vending machine and the donation transaction (i.e., $2.00 donation to the American Red Cross) is processed as the only transaction. In an alternate exemplary embodiment, the user is purchasing a product/service in addition to the donation transaction. In this case, the donation is processed concurrently with the product purchase at the vending equipment 104 and the transaction device 102 provides a combined total as the total amount due (e.g., $2.00 American Red Cross Donation and $1.00 vending product purchased results in a $3.00 transaction total at the vending equipment).

In an exemplary embodiment, the user may be associated with a loyalty reward program associated with the vending machine or a product or services offered by the vending machine. In lieu of a monetized donation amount, the user may select to donate all or a portion of their loyalty reward associated with the loyalty reward program. For example, the user can select to donate 30 loyalty reward points from their loyalty reward account.

An exemplary vending machine can include a product housing for storing a plurality if items for sale. The vending machine can include a dispenser for dispensing product. The dispenser can be configured to provide pre-packaged single serving products (e.g., cans of soda, bottles of water, packaged snacks, etc.) or the dispenser can provide continuous dispense of the product (e.g., a fountain machine). The vending machine can include a display for providing content to the user. The display can provide still images, video images, and audio files. In some embodiments, the display can include a video monitor. The vending machine can include a speaker/microphone system. An exemplary vending machine can include a touch screen device overlying the video monitor and/or a keypad for interacting with the user. The vending machine can include a combined coin validation/change dispensing device and/or a RFID sensor for use with digital wallet technology for facilitating payment.

The exemplary vending environment 100 may include a server switch 108. Server switch 108 can be a processor-based platform, such as a server. In an exemplary embodiment, the server switch 108 can store the transaction data received from the transaction devices 102. The server switch 108 may store some or all of the transaction data in an associated database or data storage unit 110. The exemplary data storage unit 110 can include one or more tangible computer-readable storage devices resident on the switch server 108 or logically coupled to the switch server 108.

In another embodiment, the server switch 108 can be operable to generate a unique identifier or token associated with secure payment information received from the transaction devices 102. In an exemplary embodiment, the server switch 108 can receive transaction information from the transaction device 102 and tokenize, hash, or otherwise encrypt the account information in a repeatable manner to generate tokenized account information. In some embodiments, a server switch 108 can generate and associate a unique identifier with some or all transactions which may be transmitted via a network 106.

In an exemplary embodiment, the server switch 108 can be operable to switch or otherwise transfer one or more transaction records between various destination servers. For example, transaction data stored on a particular server can be transferred to another server by way of the server switch 108.

The server switch 108 is operable to communicate with one or more servers and third parties such as an account processing server 112 and third party server 114. In an exemplary embodiment, the transaction device 102 can transmit transaction data via the network 106 to the server switch 108. The server switch 108 can selectively transmit some or all of the transaction data to another transaction device 102N, the account processing server 112, and a third party server 114, such as a charitable institution server, or any other device associated with a third party.

An exemplary operating environment 100 includes an account processing server 112. The account processing server 112 can include, for example, a transaction processing bureau, such as a credit card processor and/or other account processing system. An exemplary account processing server 112 can be a financial transaction processor and/or a bank including, for example, BANK OF AMERICA, HEARTLAND, VISANET, and/or other account processing systems, for processing a payment based on the transaction information received at the vending equipment 104. In an exemplary embodiment, the transaction data accepted at the vending equipment 104 for the purchase of goods or services or for completing a donation transaction is tokenized at the server switch 108 (if necessary) and communicated to the account processing server 112 for processing. The account processing server 112, using the transaction data, authorizes a user purchase transaction at the transaction device 102/vending equipment 104. In this regard, the payment for the purchased goods or services or the donation transaction can be effectuated.

An exemplary operating environment 100 includes one or more third party servers 114. In an exemplary embodiment, the third party server can include a charitable institution server. The third party servers can include a donation manager program module. The donation manager program module can be a set of computer-executable instructions stored in a processor or memory associated with the third party server 114. The donation manager program module can be operable to receive transaction data/data packets from the switch server 108 including donation transactions. The donation manager program module can be operable to reconcile the transaction data with the payment processed at the account processing server 112. In addition, the donation manager program module can be operable to communicate response data for each donation transaction and/or transaction data to the switch server 108.

The components of the exemplary vending environment 100 have been described with reference to the exemplary systems illustrated in FIG. 1. The exemplary vending environment 100 can include one or more methods or computer programs that embody the functions described herein and illustrated in FIG. 2. However, it should be apparent that there could be many different ways of implementing aspects of the exemplary embodiments in computer programming, and these aspects should not be construed as limited to one set of computer instructions. Further, a skilled programmer would be able to write such computer programs to implement exemplary embodiments based on the flow charts and associated description in the application text. Therefore, disclosure of a particular set of program code instructions is not considered necessary for an adequate understanding of how to make and use the exemplary embodiments. Further, those skilled in the art will appreciate that one or more acts described may be performed by hardware, software, or a combination thereof, as may be embodied in one or more computing systems.

Figure 2:
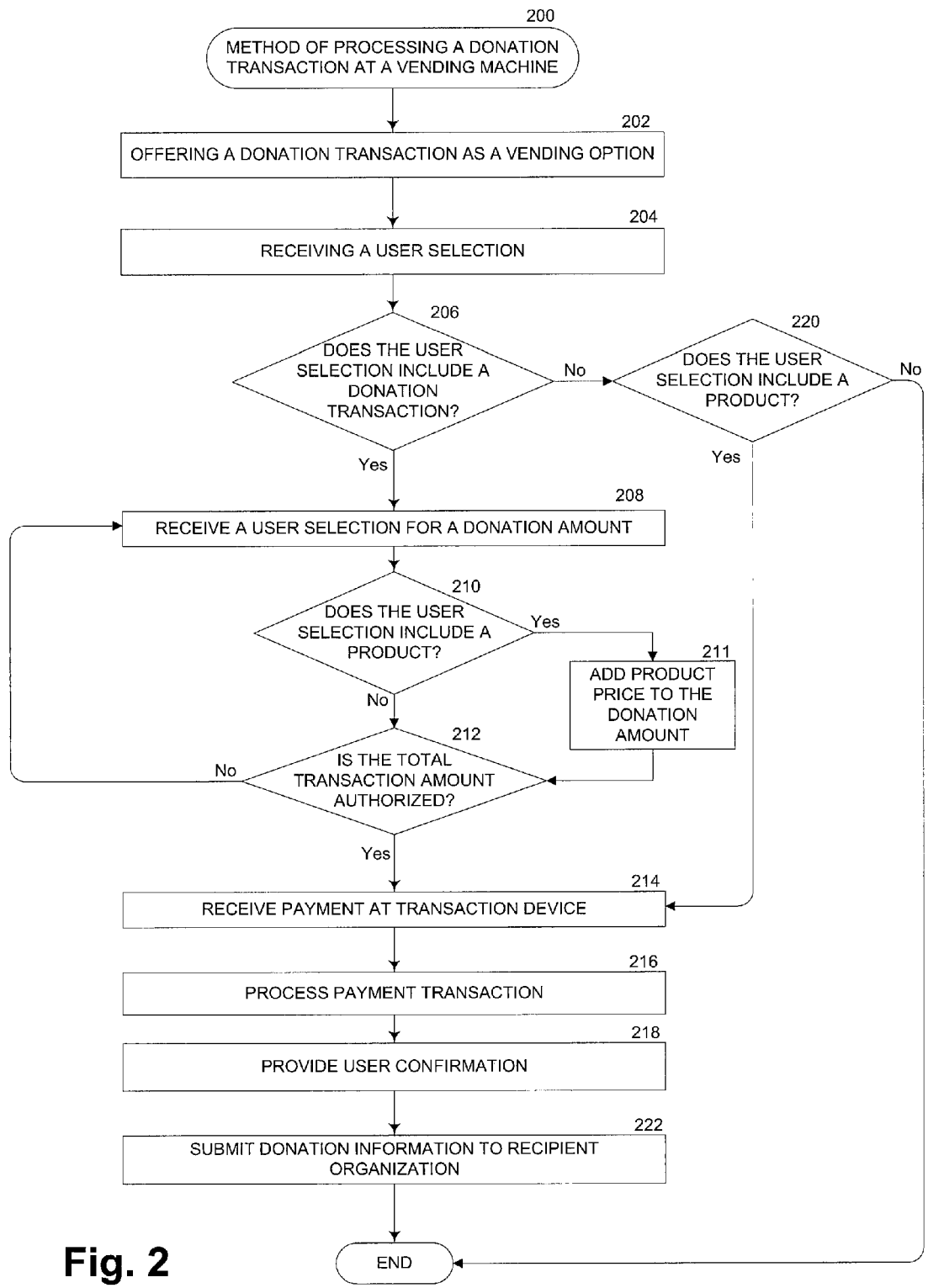
FIG. 2 is a flow chart depicting a method of processing a donation transaction at a vending machine.

FIG. 2 is a flow chart depicting a method 200 for processing a donation transaction using a vending equipment 104 such as a vending machine. In an exemplary embodiment, a vending equipment 104 is provided that includes a donation transaction as a vending option. (Step 202). A donation transaction can include a cash or cash equivalent donation charged at the vending equipment 104 and provided to the recipient organization. It is also contemplated that the vending equipment 104 can include other types of products or services offered for sale in addition to the provision of the donation transaction.

Using a display, preferably touch screen, at the vending equipment 104, the user selects at least one of a product or service offered for sale at the vending machine and a donation transaction. (Step 204). The user selection is provided from the vending equipment 104 to the transaction device 102. The user selection is evaluated at the transaction device 102 to determine if a donation transaction was selected by the user. (Step 206). In an exemplary embodiment, if no donation transaction is selected, the transaction device 102 determines if a product was selected by the user. (Step 220). If a product was selected, the transaction device proceeds to receive payment information as discussed below with respect to Step 214. If no product was selected and no donation transaction was selected, the process with respect to purchasing a product or processing a donation transaction at the vending equipment 104 is complete.

If a donation transaction was selected the donation amount must be determined. In an exemplary embodiment, the transaction device 102 can send a message to the vending equipment 104 to query the user as to their donation amount. (Step 208). The donation amount can be a preset amount, e.g., $0.50, $1.00, 2.00, etc. In an exemplary embodiment, the donation amount can be entered by the user. For example, the user could enter the dollar amount for their donation transaction.

In an exemplary embodiment, the donation amount must not be greater than the preauthorized transaction amount determined by the account processing server 112 and/or the server switch 108. For example, the account processing server 112 and/or the server switch 108 can determine an authorized transaction amount that would require the user only enter their payment information once. For example, the authorized transaction amount can be the maximum amount that the user is permitted to charge on their credit card at the vending equipment 104/transaction device 102 with each payment request (i.e., card swipe). The user could make additional purchases on their credit card, however, the additional purchases would require the user process separate payment transactions.

In an exemplary embodiment, the authorized transaction amount is related to the price of the most expensive vend item. In an exemplary embodiment, the authorized transaction amount can be no more than three times the price of the most expensive vend item. For example, if the most expensive vend item is a 20 ounce bottle of COCA-COLA priced at $2.00, the maximum authorized transaction amount would be $6.00. The authorized transaction amount is the maximum amount permitted per transaction, including both product/service purchase and donation transaction. As a result, if the user was purchasing a $2.00 bottle of COCA-COLA, the maximum amount they would be able to donate would be $4.00. Alternatively, if the user was simply making a donation transaction without purchasing a product/service, the maximum amount they would be able to donate would be $6.00.

Accordingly, if the user has selected a donation transaction and entered a donation amount, whether the user has also selected a product for purchase is determined. (Step 210). Using the maximum vend price, the server switch 108 and/or the transaction device 102 is able to determine the authorized transaction amount. In an exemplary embodiment, the user has entered only a donation amount, there is no product purchase associated with the transaction. Because no product has been selected, the total transaction amount is the donation amount. This total transaction amount/donation amount is compared to the authorized transaction amount. (Step 212). If the total transaction amount/donation amount is greater than the authorized transaction amount, the total transaction amount, and the donation amount, are not authorized. The user must select/enter a new, reduced, donation amount. (Step 208). However, if the total transaction amount/donation amount is less than or equal to the authorized transaction amount, total transaction amount/donation amount is authorized and the user selected donation amount is approved. Payment can be processed and the transaction finalized.

In an exemplary embodiment where the user has entered a donation amount and selected a product/service for purchase, the server switch 108 and/or the transaction device 102 add the product purchase price to the donation amount. (Step 211). This total transaction amount is then compared to the authorized transaction amount. (Step 212). If the total transaction amount is greater than the authorized transaction amount, the total transaction amount is not authorized. The user must select/enter a new, reduced, donation amount. (Step 208). However, if the total transaction amount is less than or equal to the authorized transaction amount, total transaction amount is authorized and the user selected donation amount is approved. Payment can be processed and the transaction finalized.

Once the donation amount is authorized, payment can be received at the transaction device 102. (Step 214). The transaction device 102 sends the transaction details to the server switch 108. The server switch 108 tokenizes, hashes, or encrypts the transaction information, if necessary, and sends the transaction information to the account processing server 112. In an exemplary embodiment, payment can be received and/or preauthorized immediately after initiating the method, i.e., before Step 202. For example, a user utilizing a RFID digital wallet resident on their mobile phone may authorize their payment before viewing or otherwise selecting a product/good for purchase or the donation transaction.

The account processing server 112, using the transaction information, processes the payment transaction and sends a message back to the server switch 108 that the payment is complete. (Step 216). The server switch 108 then sends a message to the transaction device 102 that the payment is complete and the transaction device 102 instructs the vending equipment 104 to dispense the product.

In an exemplary embodiment, the transaction device is configured to provide a confirmation to the user that the transaction is complete. (Step 218). The confirmation can include, for example, a paper receipt provided at the vending equipment 104, a display provided on the vending equipment 104, and electronic receipt provided to the user. The electronic receipt can be transmitted to the user using RFID or other digital wallet technology. In an alternate embodiment, the vending equipment 104/transaction device 102 can request user contact information for providing an electronic receipt emailed to the user. In an exemplary embodiment, the contact information can include the user's profile information on a social networking site. In response to the confirmation, the server switch 108 can post to the user's profile and/or permit the user to post to their profile information regarding their donation transaction. Information posted to a user's social networking site social profile can include, for example, location of donation, recipient charity, amount of donation, and any other information relevant to the donation transaction. The user contact information is provided to the server switch 108 where the electronic receipt is distributed.

In an exemplary embodiment, the transaction information is provided from the transaction device 102/vending equipment 104 to the server switch 108. The server switch 108 can provide the transaction information, including the donation information, to the third party server 114. (Step 222). The third party server 114 can include a donation manager program operable to reconcile the transaction data with the payments processed by the account processing server 112.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although the present invention is described with reference to exemplary embodiments, it should be appreciated by those skilled in the art that various modifications are well within the scope of the invention. From the foregoing, it will be appreciated that an embodiment of the present invention overcomes the limitations of the prior art. Those skilled in the art will appreciate that the present invention is not limited to any specifically discussed application and that the embodiments described herein are illustrative and not restrictive. From the description of the exemplary embodiments, equivalents of the elements shown therein will suggest themselves to those skilled in the art, and ways of constructing other embodiments of the present invention will suggest themselves to practitioners of the art. Therefore, the scope of the present invention is not limited herein.

What is claimed is:

1. A vending machine, comprising:
    a product housing storing a product offered for sale by the vending machine;
    a dispenser for dispensing the product;
    a transaction device operable to:
        determine a preauthorized transaction amount for a cashless transaction;
        determine a first selection of a purchase transaction associated with a purchase by a user of at least one of the product or a service offered for sale at a purchase price by the vending machine, wherein the purchase transaction is for the purchase price;
        determine a second selection of a donation transaction comprising a selection of a donation amount after determining the first selection, wherein the donation transaction is independent of the purchase transaction, and wherein the donation amount is limited by the preauthorized transaction amount for the cashless transaction; and
        facilitate a payment transaction associated with the first selection and the second selection; and
    a controller for controlling operation of the vending machine and operable to communicate with the transaction device, the controller further operable to provide instructions to the dispenser for dispensing a product in response to the payment transaction facilitated at the transaction device.

2. The vending machine of claim 1, further comprising:
    a display for providing the user a selection of at least one of the product, the service, and the donation transaction, the display configured to receive a user selection of at least one of the product, the service, and the donation transaction;
    wherein the controller is further operable to communicate with the display to provide instructions for displaying the selection to the user and receiving the user selection.

3. The vending machine of claim 1, wherein the payment transaction is at least one of a cash transaction or a cashless transaction.

4. The vending machine of claim 1, wherein the transaction device is configured to provide a receipt to the user in response to the payment transaction,
    wherein the controller is further operable to transmit an electronic receipt to the user in response to the payment transaction.

5. The vending machine of claim 1, wherein the controller is operable to communicate with a server remote from the vending machine.

6. The vending machine of claim 1, wherein the controller is operable to solicit user information at a display in response to the payment transaction.

7. The vending machine of claim 1, wherein the preauthorized transaction amount is a multiple of the purchase price.

8. The vending machine of claim 1, wherein the donation amount is limited by a purchase price of the most expensive product or service offered for sale by the vending machine.

9. The vending machine of claim 1, wherein the donation amount is independent of both the purchase price and a payment amount.

10. The vending machine of claim 1, wherein:
    the transaction device is further operable to determine that a total of the selected donation amount and the purchase price is greater than the preauthorized transaction amount; and
    the transaction device is further operable to request a selection of a reduced donation amount by the user.

11. A method of operating a vending machine comprising:
    receiving, at the vending machine, payment information for a payment transaction that is a cashless transaction;
    determining a preauthorized transaction amount for the cashless transaction based at least in part on the payment information;
    receiving a first user selection of a purchase transaction associated with a purchase by a user of at least one of a product or a service offered for sale at a purchase price by the vending machine, wherein the purchase transaction is for the purchase price;
    receiving a second user selection of a donation transaction comprising a selection of a donation amount after receiving the first user selection, wherein the donation transaction is independent of the purchase transaction, and wherein the donation amount is limited by the preauthorized transaction amount for the cashless transaction;
    facilitating the payment transaction, wherein the payment transaction is associated with the first and second user selections;
    processing the payment transaction; and causing a dispenser of the vending machine to dispense the product from a product housing of the vending machine after processing the payment transaction.

12. The method of claim 11, wherein the first and second user selections include a donation and at least one of the product or the service.

13. The method of claim 11, further comprising:
receiving at the vending machine a user indication of the donation amount associated with the donation transaction,
wherein the payment associated with the second user selection of the donation transaction corresponds to the user indication of the donation amount.

14. The method of claim 11, wherein the payment associated with the second user selection of the donation transaction corresponds to a previously determined donation amount.

15. The method of claim 11, further comprising:
providing at a display interface a representation of at least one of the product, the service, and the donation transaction,
wherein the representation includes at least one of an image, a video image, and an audio file.

16. The method of claim 11, wherein the vending machine communicates with a server remote from the vending machine, the vending machine communication including at least one of user identification information and transaction information.

17. The method of claim 16, wherein the user identification information includes a user profile on a social networking site.

18. The method of claim 11, further comprising:
providing a receipt to the user in response to the payment transaction,
wherein the receipt includes at least one of a physical receipt dispensed from the vending machine and an electronic receipt, and
wherein the receipt identifies a payment amount associated with each of the selected items for purchase.

19. A computer-readable storage medium storing instructions that when executed by a processor cause a computer to perform operations for providing a donation transaction at a vending machine, the operations comprising:
receiving, at the vending machine, payment information for a cashless transaction;
determining a preauthorized transaction amount for the cashless transaction at the vending machine;
receiving a first user selection of a purchase transaction associated with a purchase by a user of at least one of a product or a service offered for sale at a purchase price by the vending machine, wherein the purchase transaction is for the purchase price;
receiving a second user selection of a donation transaction comprising a selection of a donation amount after receiving the first user selection, wherein the donation transaction is independent of the purchase transaction, and wherein the donation amount is limited by the preauthorized transaction amount for the cashless transaction;
facilitating the payment transaction, wherein the payment transaction is associated with the first and second user selections at a transaction device coupled to the vending machine; and
processing the payment; and
causing a dispenser of the vending machine to dispense the product from a product housing of the vending machine after processing the payment transaction.

* * * * *